(12) United States Patent
Heydenrych

(10) Patent No.: US 10,041,003 B2
(45) Date of Patent: Aug. 7, 2018

(54) APPARATUS FOR ENDOTHERMIC REACTIONS

(71) Applicant: University of Pretoria, Hatfield (ZA)

(72) Inventor: Michael David Heydenrych, Centurion (ZA)

(73) Assignee: University of Pretoria, Pretoria (ZA)

( * ) Notice: Subject to any disclaimer, the term of this patent is extended or adjusted under 35 U.S.C. 154(b) by 258 days.

(21) Appl. No.: 14/898,116

(22) PCT Filed: Jun. 13, 2014

(86) PCT No.: PCT/ZA2014/000027
§ 371 (c)(1),
(2) Date: Dec. 11, 2015

(87) PCT Pub. No.: WO2015/003193
PCT Pub. Date: Jan. 8, 2015

(65) Prior Publication Data
US 2016/0130503 A1    May 12, 2016

(30) Foreign Application Priority Data

Jun. 14, 2013  (ZA) .................................. 2013/04409

(51) Int. Cl.
*C10B 49/22* (2006.01)
*C10J 3/46* (2006.01)
(Continued)

(52) U.S. Cl.
CPC .............. *C10B 49/22* (2013.01); *B01J 8/002* (2013.01); *B01J 8/1809* (2013.01); *B01J 8/1827* (2013.01);
(Continued)

(58) Field of Classification Search
CPC ......................... C10J 2300/1637; C10B 49/22
See application file for complete search history.

(56) References Cited

U.S. PATENT DOCUMENTS

| 2,445,327 A * | 7/1948 | Keith ........................ B01J 8/26 201/16 |
| 4,274,941 A | 6/1981 | Janssen et al. |

(Continued)

FOREIGN PATENT DOCUMENTS

| SU | 1386635 A1 | 4/1988 |
| WO | WO 2012/034141 | 3/2012 |

*Primary Examiner* — Matthew J Merkling
(74) *Attorney, Agent, or Firm* — Knobbe Martens Olson & Bear, LLP

(57) ABSTRACT

The invention provides an apparatus which consists of two fluidized beds 1 and 2 separated by a vertical divides' 5. A positive displacement device such as an auger 3 moves the bed material from the reduction side to the combustion side of the device below the fluidization zone. The height of the two fluidized beds is equalized by movement of the bed material through a hole 4 In the vertical divider, from the high temperature side 1 (zone 1) to the tow temperature side 2 (zone 2). The bed material that moves through the hole 4 provides energy to drive reactions that may occur on the reduction side. Energy may also be provided to zone 2 by means of conductive and radiative heat transfer through the dividing wall 5. Energy is provided to zone 1 by means of an exothermic reaction, typically combustion of a fuel 13 using air 12.

7 Claims, 1 Drawing Sheet

Figure 1:
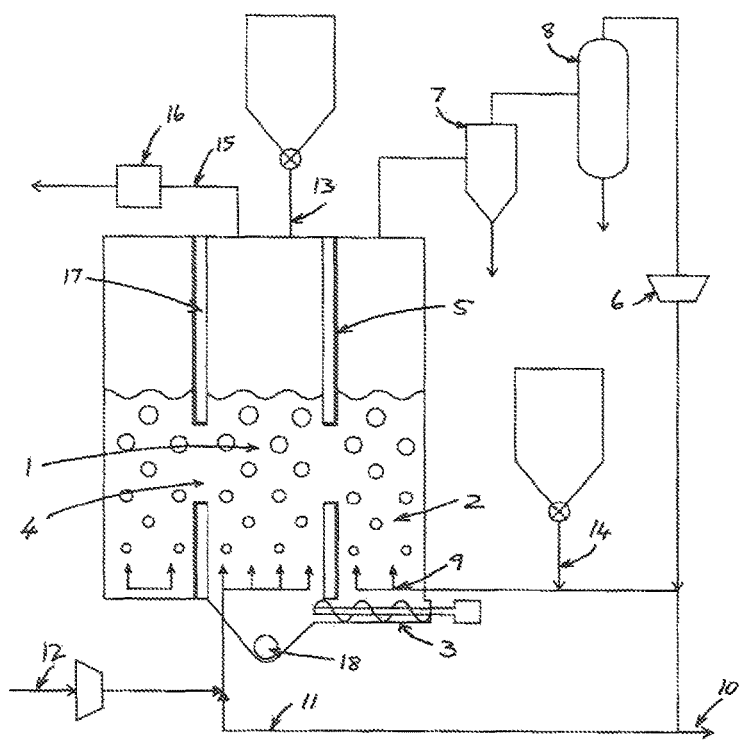

(51) Int. Cl.
    *C10B 53/02*     (2006.01)
    *B01J 8/18*     (2006.01)
    *B01J 8/26*     (2006.01)
    *F23C 10/00*     (2006.01)
    *F23G 5/02*     (2006.01)
    *C10B 57/02*     (2006.01)
    *C10B 57/06*     (2006.01)
    *B01J 8/00*     (2006.01)
    *F23C 10/01*     (2006.01)
    *F23G 5/027*     (2006.01)
    *F23G 5/30*     (2006.01)

(52) U.S. Cl.
    CPC ............... *B01J 8/1872* (2013.01); *B01J 8/26* (2013.01); *C10B 53/02* (2013.01); *C10B 57/02* (2013.01); *C10B 57/06* (2013.01); *C10J 3/463* (2013.01); *F23C 10/005* (2013.01); *F23C 10/01* (2013.01); *F23G 5/0276* (2013.01); *F23G 5/30* (2013.01); *B01J 2208/0084* (2013.01); *B01J 2208/00212* (2013.01); *B01J 2208/00274* (2013.01); *B01J 2208/00761* (2013.01); *B01J 2208/00902* (2013.01); *B01J 2208/00938* (2013.01); *C10J 2200/152* (2013.01); *C10J 2300/0916* (2013.01); *C10J 2300/0946* (2013.01); *C10J 2300/0976* (2013.01); *C10J 2300/0996* (2013.01); *C10J 2300/1637* (2013.01); *C10J 2300/1687* (2013.01); *C10J 2300/1807* (2013.01); *C10J 2300/1853* (2013.01); *C10J 2300/1876* (2013.01); *F23G 2201/301* (2013.01); *F23G 2201/304* (2013.01); *F23G 2900/50202* (2013.01); *Y02E 50/14* (2013.01)

(56) References Cited

U.S. PATENT DOCUMENTS

| | | | |
|---|---|---|---|
| 4,324,620 A | 4/1982 | Ito et al. | |
| 4,459,133 A | 1/1984 | Moss | |
| 8,292,977 B2* | 10/2012 | Suda | C10J 3/482 110/230 |
| 2002/0078867 A1* | 6/2002 | Paisley | C10B 49/22 110/210 |
| 2014/0008205 A1* | 1/2014 | Heydenrych | C10B 49/22 201/31 |

* cited by examiner

APPARATUS FOR ENDOTHERMIC REACTIONS

INCORPORATION BY REFERENCE TO RELATED APPLICATIONS

Any and all priority claims identified in the Application Data Sheet, or any correction thereto, are hereby incorporated by reference under 37 CFR 1.57. This application is the national phase under 35 U.S.C. § 371 of prior PCT International Application No. PCT/ZA2014/000027 which has an International Filing Date of Jun. 13, 2014, which designates the United States of America, and which claims priority to South Africa Application No. 2013/04409 filed Jun. 14, 2013. Each of the aforementioned applications is incorporated by reference herein in its entirety, and each is hereby expressly made a part of this specification.

FIELD OF THE INVENTION

The invention relates to an apparatus for endothermic processes. One such type of process is pyrolysis of carbonaceous materials.

BACKGROUND TO THE INVENTION

WO 2012/1034141 provided a carbonaceous feed pyrolysis apparatus including two or more hot particle fluidised beds, and one or more positive displacement apparatus for the transfer of hot particles between two or more of the beds. One or more of the fluidised beds may contain a combustion zone. One or more of the fluidised beds may contain a pyrolysis zone. The positive displacement apparatus may be a screw feeder or the like. The apparatus of WO 2012/031414 may include one or more "L" valves between the combustion and pyrolysis zones so that hot particles may flow from the combustion zone or zones to the pyrolysis zone or zones while impeding the flow of gas in the opposite direction.

The inventor has now, after extensive research, identified that the apparatus of WO 2012/034141 has practical limitations and that the heat loss makes it impractical to operate without additional fuel and a need was thus identified for a new and efficient apparatus to carry out these and other endothermic processes.

The inventor thus now proposes the invention described hereinbelow.

SUMMARY OF THE INVENTION

According to a first aspect of the invention, there is provided an endothermic reaction apparatus, said apparatus including:
  two or more fluidised bed zones;
  an apertured divider having one or more aperture therethrough connecting at least two of the fluidised bed zones; and
  a mass transfer device for transferring particulate matter from at least one fluidised bed one to another fluidised bed zone,
  wherein
  a second fluidised bed zone gas feed includes a closed gas loop whereby, in use, a portion of the gas produced in said zone and is recycled thereto in the closed gas loop so that this gas is used as the gaseous fuel for the first fluidised bed zone, either fully or in part;
  a gas loop purge whereby part of the recycled gas stream from the second fluidised bed zone is purged from the closed gas loop; and
  a flow rate regular whereby, in use, the flow rate is regulated to a predeterminable rate.

The mass transfer device may transfer particulate matter from the on fluidised bed zone to the another fluidised bed zone below the fluidised bed zones.

The particulate matter may include particulate material of the fluidised bed.

The two or more fluidised bed zones may be in an annular arrangement wherein a first fluidised bed zone is substantially surrounded by a second fluidised bed zone with the apertured divider being located between the first and second fluidised bed zones.

Wherein an annulus may formed between an outer wall of the second fluidised bed zone and the divider between the first and second fluidised bed zones.

The term "concentrically" should not be interpreted to limit the arrangement to a pair of round tubular fluidised bed zones and the geometry thereof is not to be limited as such and includes oval, polygonal, frusto-conical, and the like.

In use, the first fluidised bed gas feed flow rate is set at a suitable high flow rate to ensure fluidisation of the first zone, but not too high to cause excessive entrainment of particles from the bed. Usually this gas will be air, or an oxygen-rich gas. Energy is provided to the aforementioned zone by combustion of a fuel with the air. The temperature in this zone may be controlled by controlling the flow rate of the fuel, which may be a solid, liquid or gaseous fuel. Typically therefore there will be residual oxygen in the gas leaving this zone.

According to a second aspect of the invention, there is provided a pneumatic injector for injecting gas and/or pneumatically conveyed solid material into a fluidised bed, said injector protecting the gas and/or solid material from heat transfer by an annulus of cold gas, the injector including a central tube which should not extend into the fluidised bed, but rather extend to slightly short of the bed by approximately one diameter of the outer tube, the injector including a circular length of pipe for injecting the gas into the fluidised bed whereby, in use, the gas and solids are injected into the pipe tangentially, preferably with a narrowing of the pipe as it enters the circular pipe, wherein an outer wall of the circular length is aperture and, in use, the apertures act as fluidised bed nozzles.

The arrangement of the circular pipe acts as an eductor to cause gas to circulate rapidly in the circular tube whereby centrifugal force will cause the solid material to move along the outer wall of the circular pipe and holes in the outer wall of the circular pipe will act as fluidised bed nozzles, and the solid is injected into the fluidised bed through these nozzles. The circular movement of the bed allows sawdust/biomass to be fed in one spot without causing a cold spot in the pyrolysis bed.

These nozzles may be directed tangentially to induce circular motion to the fluidised bed within the annulus.

The circular pipe may be protected from the heat transfer provided by the fluidised bed particles. This may be achieved by providing a shield above the pipe with a small air gap between it and the circular pipe. Such a shield may be angled to allow the fluidised bed particles to slip off into the path of the fluidising gas.

The injection may be of gas alone.

The solid material may be introduced separately using a heat tube auger design.

According to a third aspect of the invention, there is provided an endothermic reaction process, said process including:
- combusting a carbonaceous material in the presence of oxygen in a first fluidised bed zone;
- carrying out one or more endothermic reactions in a second fluidised bed zone separated from the first fluid bed zone by an apertured divider;
- transferring fluidised bed material from the hot first fluidised bed zone through one or more apertures to the second fluidised bed zone; and
- displacing fluidised bed particulate material below the fluidised bed zones by means of a positive displacement mass transfer device.

The temperature in the second fluidised bed zone may be regulated by the rate at which the particulate material below the fluidised bed is displaced.

The height of the two fluidised beds may be self regulated by means of material transfer between the two fluidised beds through the one or more apertures in the divider.

Fluidising gas in the second fluidised bed zone may be recirculated and solid and liquid products may be removed as part of the recirculation loop and a portion of the recirculated gas may be introduced into the second fluidised bed through nozzles.

Where there is a net production of gas in the recirculation loop, it may be removed as a purge This gas may be a desired product of the reaction occurring in second fluidised bed zone.

Excess gas may be returned to the first fluidised bed one where combustible gases will be burned.

The endothermic process may be a pyrolysis process including pyrolysis of a carbonaceous bio-mass wherein a first combustion zone is carried out in one, or more combustion fluidised beds in which a particulate material is fluidised and heated, and a second pyrolysis zone carried out in one or more pyrolysis fluidised beds in which the hot particles heated in the combustion zone are used for pyrolysis of the bio-mass, said combustion zone being operated at a temperature of from 400° C. to 1100° C., typically around 900° C., and the pyrolysis zone being operated at a temperature of from 400° C. to 900° C., typically 450° C. to 600° C.

The pyrolysis zone and the combustion zone may be at substantially the same pressure so that the levels of both beds are similar and there is minimal flow of gas between the two zones, and may be operated typically at or about atmospheric pressure, but may be operated at higher pressures up to about 100 Barg.

Thus, in this embodiment, the combustion fluidised beds are the first fluidised bed zones of the invention and the pyrolysis fluidised beds are in the second fluidised bed zones.

Pyrolysis gas from the pyrolysis zone may be at least partially recycled to the combustion zone as a source of fuel for the combustion used to heat the particles.

The hot particles may be sand particles, or catalyst particles.

The hot particles may pass through the aperture divider from the combustion zone into the pyrolysis zone.

The pyrolysis zone may be operated at or about atmospheric pressure.

The use of catalyst in the pyrolysis one may allow more throughput of bio-mass because more $CO_2$ is produced and therefore the process will be less endothermic.

The catalyst typically a cracking catalyst such as an acidic zeolite.

DESCRIPTION OF EMBODIMENTS OF THE INVENTION

Figure 2:
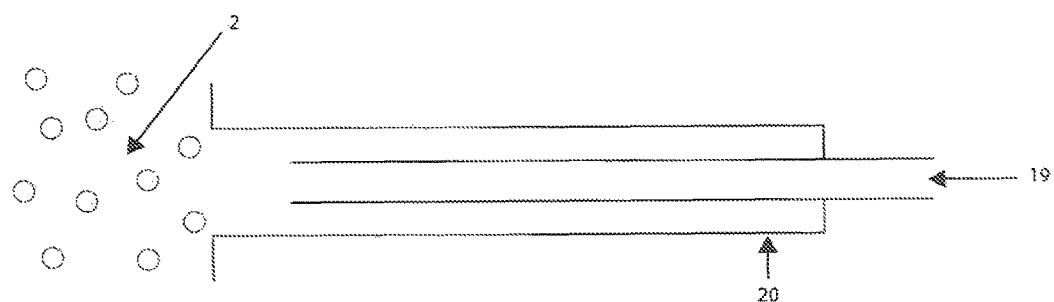

The invention will now be described, by way of non-limiting example only, with reference to the accompanying diagrammatic drawings. In the drawings, FIG. 1 shows a flow diagram of an endothermic reaction apparatus, and FIG. 2 shows a device for feeding heat-sensitive materials into a hot fluidised bed.

In the Figures, a basic endothermic reaction apparatus generally in accordance with the invention is shown. The apparatus consists of two fluidised beds 1 and 2 separated by a vertical divider 5. A positive displacement device such as an auger 3 moves the bed material from the reduction side to the combustion side of the device below the fluidisation zone.

The height of the two fluidised beds is equalised by movement of the bed material through a hole 4 in the vertical divider, from the high temperature side 1 (zone 1) to the low temperature side 2 (zone 2).

The bed material that moves through the hole 4 provides energy to drive reactions that may occur on the reduction side. Energy may also be provided to zone 2 by means of conductive and radiative heat transfer through the dividing wall 5. Energy is provided to zone 1 by means of an exothermic reaction, typically combustion of a fuel 13 using air 12.

The temperature in the reduction zone 2 may a be controlled by the speed of the auger 3.

The fluidising gas in zone 2 is recirculated using blower 6. This gas say be cooled, and solid and liquid products may be removed (7 and 8 respectively) as part of the recirculation loop. The gas is introduced into zone 2 through nozzles 9. If there is a net production of gas in the recirculation loop, it may be removed as a purge 10. This may be a desired product of the reaction occurring in fluidised bed 2. The excess gas may be returned to zone 1 through line 11, and combustible gases will be burned in zone 1.

In previous inventions involving dual bed designs, the amount of gas recirculated through 11 or purged through 10 is controlled typically through the pressure in the freeboard above beds 1 and 2. In this invention it is proposed that the flow rate of the gas in streams 10 and 11 is set, and controlled at this set flow rate. This flow rate may be coupled to be proportional to the feed rate of reactant 14 to zone 2. If this set flow rate is less than the net rate of formation of gas in the recirculation loop 6, then there will be a net flow of gas from fluidised bed zone 2 to zone 1 through hole 4. Conversely, if the net flow in streams 10 and 11 is more than the net rate of formation of gas in the recirculation loop 6, then there will be a net flow of gas from fluidised bed zone 1 to zone 2 (and some nitrogen can be expected in lines 10 and 11 from the combustion air).

The total flow rate in streams 10 and 11 should be set according to a ratio proportional to the rate of feed 14. This ratio might change if conditions in zone 2 change (such as the temperature of zone 2).

The fluidized bed 2 may be arranged to surround the hotter fluidised bed 1. In this way, heat losses from the device as a whole are reduced, because the external walls where heat loss occurs are the walls of the colder fluidised bed, which makes thermal insulation easier. An instance of this is to have a vertical cylindrical fluidised bed 1, with the fluidised bed 2 forming an annulus around bed 1.

The nozzles 9 may be directed in such a way to induce a flow in the fluidised bed 2 in a circular motion around the axis of the annulus. This has the advantage that the bed is continually renewed at the location where reactants (stream 14) are introduced into the fluidised bed, thereby avoiding cold spots and promoting good mixing.

The separating wall 5 may be protected by a layer of heat and abrasion resistant material on either or both sides of the separating wall, particularly on the hot side (17) where metals are vulnerable to erosion due to the action of the fluidised bed 1 and the associated high temperatures.

Clinker that forms in the hot fluidised bed may be removed by an additional auger 18.

The outer wall of the annular colder zone 2 can be thermally insulated to prevent heat loss from the device as a whole.

As an example, the device may, be used as a pyrolysis apparatus where the material to be pyrolysed is introduced directly into zone 2, char is removed at 7, the stream is cooled and bio-oil, is removed at 8. The flow of gas in 11 is chosen to be approximately what can be expected from pyrolysis at the chosen conditions, and typically no gas exits through 10.

The gas provided by stream 11 is mixed with air before entering the combustion fluidised bed 1. Additional fuel (13) may be added to maintain the combustion fluidised bed (1) temperature (typically 850° C. to 950° C.). This fuel may be similar to the material added at 14, but will typically have a larger particle size.

The temperature of the pyrolysis fluidised bed 2 may be increased to increase the amount of gas produced, until the device as a whole is self-sufficient on feed 14, and requiring no fuel 13.

The temperature of the pyrolysis fluidised bed 2 may be increased further to increase the amount of as produced, and additional gas will be released through 10. In this way, the device may be operated as a gasifier.

It is anticipated that the pyrolysis feed 14 may consist of traditional solid biomass, recycled plastics, car tyres or coal, but may also be organic liquids such as glycerol or and this apparatus may be suitable to gasify or reform such feed material to a gas containing low nitrogen levels, using air rather than oxygen as the energy source. When, operated as a gasifier, additional steam may be added to zone 2.

The selection of suitable flow rates in streams 10 and 11 allows the device to be operated easily at different pressures, including pyrolysis and gasification at high pressures such as 1-3 MPa. The annular pyrolysis device has a shape that is easily adapted to pressure operation.

The hot gases 15 can be used to generate steam, create shaft work through a turbine, or to heat treat char to give a higher quality product. Residual heat can be used to dry biomass before feeding it to the pyrolysis reactor through 14.

Zone 1 is normally operated as a combustion bed, but may alternatively be operated in reducing atmosphere in which substantially all of the oxygen is reacted and carbon monoxide forms along with the carbon dioxide. This mode of operation is useful if the fluidised bed is composed mainly of char. Steam gasification can take place in zone 2 by replacing the blower 6 with a single or multi-stage steam eductor-jet pump. The hot gases 15 may then be burned in a secondary combustor/turbine 16 and the energy used as previously described.

Co-generated heat from stream 15 and heat emitted from the cooler represented by 8 can be used off-plant such as steam for process heat or hot water for house heating if the pyrolysis unit replaces a domestic furnace.

The bed material 1 and 2 can be a catalyst to produce targeted products in zone 2. Catalysts typically coke up at higher temperatures, and zone 1 is suitable for combusting such char and regenerating the catalyst. In this way, catalyst can be continually regenerated.

The bed material can be an oxygen carrier. The bed material can be chosen to react with oxygen in the feed material 14 in zone 2, and release such oxygen in zone 1 where it is heated to a higher temperature. An example of such a system is calcium oxide and calcium hydroxide or calcium carbonate.

The device that provides feed material to zone 2 (stream 14) may be injecting heat-sensitive material into a hot zone 2. This may be done using an auger that is partially filled with a liquid such as water or ethanol, promoting heat transfer from the part of the auger in contact with zone 2 to a part of the auger where the heat can be removed by cooling water or cooling air using cooling fins. The tube that houses the auger may be designed in a similar way as a heat tube to keep the auger cool. The auger screw may be hollow to allow the cooling fluid to reach the tip of the screw.

Alternatively, heat sensitive material may be introduced to zone 2 by a pneumatic injector. FIG. 2 shows how pneumatically conveyed solid material 19 is protected from heat transfer at the entrance to zone 2 by an annulus of cold air 20. Together the two gas streams provide the nozzle providing fluidisation gas to zone 2. The central tube should not extend into the bed, but rather extend to slightly short of the bed by approximately one diameter of the outer tube.

A similar pneumatic feeder may be used for an annular shape of zone 2 by using a circular length of pipe for injecting the gas. The cool gas and solids are injected into the pipe tangentially, preferably with a narrowing of the pipe as it enters the circular pipe. This will act as an eductor to cause gas to circulate rapidly in the circular tube. Centrifugal force will cause the solid material to move along the outer wall of the circular pipe. Holes in the outer wall of the circular pipe act as fluidised bed nozzles, and the solid is injected into the fluidised bed through these nozzles. These nozzles may be directed tangentially to induce a circular motion to the bed within the annulus.

The circular pipe should be protected from the heat transfer provided by the fluidised bed particles. This can be achieved by providing a shield above the pipe with a small air gap between it and the circular pipe. Such a shield should be angled to allow the fluidised bed particles to slip off into the path of the fluidising gas.

Particles may clog the fluidised bed nozzles. This may be prevented by placing a ball in the circular pipe. The ball continually moves with the gas in the pipe, thereby preventing blockage of the fluidised bed jets. The diameter of the ball should typically be 0.9 to 0.5 times the inner diameter of the circular pipe.

The invention claimed is:

1. An endothermic reaction apparatus, comprising:
    two or more fluidized bed zones comprising a first fluidized bed zone and a second fluidized bed zone, wherein the two or more fluidized bed zones are concentrically arranged, whereby an annulus is formed between an outer wall of the second fluidized bed zone and the apertured divider between the first fluidized bed zone and second fluidized bed zone;
    a second fluidized bed zone gas feed comprising a closed gas loop configured such that, in use, a portion of a gas produced in the second fluidized bed zone is recycled in the closed gas loop to the first fluidized bed zone, such that the recycled gas is used as a gaseous fuel for the first fluidized bed zone, either fully or in part;

an apertured divider having one or more apertures therethrough connecting at least two of the fluidized bed zones;

a mass transfer device for transferring particulate matter from at least one fluidized bed zone to an other fluidized bed zone;

a gas loop purge configured such that, in use, a part of the recycled gas stream from the second fluidized bed zone is purged from the closed gas loop; and a flow rate regulator configured to, in use, regulate a flow rate to a predeterminable rate.

2. An endothermic reaction apparatus, comprising:

two or more fluidized bed zones comprising a first fluidized bed zone and a second fluidized bed zone;

a second fluidized bed zone gas feed comprising a closed gas loop configured such that, in use, a portion of a gas produced in the second fluidized bed zone is recycled in the closed gas loop to the first fluidized bed zone, such that the recycled gas is used as a gaseous fuel for the first fluidized bed zone, either fully or in part;

an apertured divider having one or more apertures therethrough connecting at least two of the fluidized bed zones;

a mass transfer device for transferring particulate matter from at least one fluidized bed zone to an other fluidized bed zone;

a gas loop purge configured such that, in use, a part of the recycled gas stream from the second fluidized bed zone is purged from the closed gas loop;

a flow rate regulator configured to, in use, regulate a flow rate to a predeterminable rate; and a pneumatic injector configured for injecting a gas and/or a pneumatically conveyed solid material into a fluidized bed, wherein the injector is configured to protect the gas and/or the pneumatically conveyed solid material from heat transfer by an annulus of cold gas, wherein the injector comprises a central tube which does not extend into the fluidized bed, but rather extends to slightly short of the fluidized bed by approximately one diameter of an outer tube, the injector comprising a circular length of pipe configured for injecting the gas into the fluidized bed such that, in use, the gas and the pneumatically conveyed solid material are injected into the pipe tangentially.

3. The endothermic reaction apparatus of claim 2, wherein the central tube narrows as it enters the circular pipe, wherein an outer wall of the circular pipe comprises apertures and wherein, in use, the apertures act as fluidized bed nozzles.

4. The endothermic reaction apparatus of claim 2, wherein the fluidized bed nozzles are directed tangentially so as to induce a circular motion to the fluidized bed within the annulus.

5. The endothermic reaction apparatus of claim 2, wherein the circular pipe is protected from heat transfer provided by the fluidized bed particles by providing a shield above the circular pipe with a small air gap between the shield and the circular pipe.

6. The endothermic reaction apparatus of claim 5, wherein the shield is angled so as to allow the fluidized bed particles to slip off into a path of a fluidizing gas.

7. The endothermic reaction apparatus of claim 2, wherein a heat tube auger permits the solid material to be introduced separately from the gas.

* * * * *